(12) United States Patent
Asakura et al.

(10) Patent No.: US 10,661,824 B2
(45) Date of Patent: May 26, 2020

(54) STEERING SYSTEM

(71) Applicant: JTEKT CORPORATION, Osaka-shi, Osaka (JP)

(72) Inventors: Toshihiro Asakura, Chiryu (JP); Takuya Nakayama, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 260 days.

(21) Appl. No.: 15/938,686

(22) Filed: Mar. 28, 2018

(65) Prior Publication Data

US 2018/0281843 A1 Oct. 4, 2018

(30) Foreign Application Priority Data

Apr. 4, 2017 (JP) ................................ 2017-074476

(51) Int. Cl.
| *B62D 5/04* | (2006.01) |
| *B62D 3/12* | (2006.01) |
| *F16H 7/02* | (2006.01) |
| *F16H 25/22* | (2006.01) |
| *F16H 57/02* | (2012.01) |

(Continued)

(52) U.S. Cl.
CPC ........... *B62D 5/0448* (2013.01); *B62D 3/126* (2013.01); *B62D 5/0403* (2013.01); *B62D 5/0424* (2013.01); *F16H 7/023* (2013.01); *F16H 25/2204* (2013.01); *F16H 25/24* (2013.01); *F16H 55/171* (2013.01); *F16H 57/02* (2013.01);

(Continued)

(58) Field of Classification Search
CPC ...... B62D 5/04; B62D 5/0445; B62D 5/0448; B62D 3/00; B62D 3/06; B62D 3/12; F16H 7/023; F16H 55/171
See application file for complete search history.

(56) References Cited

U.S. PATENT DOCUMENTS 4,754,829 A * 7/1988 Shimizu ............... B62D 5/0424
180/446
2003/0188919 A1* 10/2003 Suzuki ..................... H04R 7/20
181/171

(Continued)

FOREIGN PATENT DOCUMENTS

| DE | 102007049114 A1 | 4/2009 |
| EP | 2128496 A2 | 12/2009 |
| WO | 2015/071057 A1 | 5/2015 |

OTHER PUBLICATIONS

Aug. 30, 2018 extended European Search Report issued in European Patent Application No. 18165383.3.

*Primary Examiner* — Tony H Winner
(74) *Attorney, Agent, or Firm* — Oliff PLC

(57) ABSTRACT

A steering system with a reduced number of parts is provided. A driven pulley has a radially outer portion, a radially inner portion, and a connection portion that connects the radially outer portion and the radially inner portion to each other. The radially inner portion is provided with a plurality of slits at equal intervals in the circumferential direction. A plurality of retention portions are provided at portions of the radially inner portion between the slits. Lug portions are provided on the inner surface of the distal ends of the retention portions. A groove is provided in the outer peripheral surface of a ball screw nut. The lug portions of the retention portions are fitted with the groove of the ball screw nut.

8 Claims, 7 Drawing Sheets

(51) Int. Cl.
  *F16H 25/24*  (2006.01)
  *F16H 55/17*  (2006.01)
  *F16H 55/48*  (2006.01)
  *F16H 25/20*  (2006.01)

(52) U.S. Cl.
  CPC ...... *F16H 55/48* (2013.01); *F16H 2025/2096* (2013.01); *F16H 2057/02034* (2013.01)

(56) References Cited

U.S. PATENT DOCUMENTS

| | | | |
|---|---|---|---|
| 2013/0048411 A1* | 2/2013 | Lee | B62D 5/0427 180/444 |
| 2014/0090921 A1 | 4/2014 | Shavrnoch et al. | |
| 2014/0100070 A1 | 4/2014 | Jung | |
| 2014/0353068 A1* | 12/2014 | Yamamoto | B62D 5/0412 180/444 |
| 2017/0225705 A1* | 8/2017 | Tomikawa | B62D 5/0424 |
| 2017/0334479 A1* | 11/2017 | Asakura | B62D 5/0424 |
| 2018/0346015 A1* | 12/2018 | Tomikawa | B62D 5/0448 |
| 2019/0315390 A1* | 10/2019 | Shirauchi | F16H 1/00 |

* cited by examiner

STEERING SYSTEM

INCORPORATION BY REFERENCE

The disclosure of Japanese Patent Application No. 2017-074476 filed on Apr. 4, 2017 including the specification, drawings and abstract, is incorporated herein by reference in its entirety.

BACKGROUND OF THE INVENTION

1. Field of the Invention

The present invention relates to a steering system.

2. Description of the Related Art

There has hitherto been known an electric power steering (EPS) device that assists a driver in performing a steering operation by converting rotational torque of a motor into a force that linearly moves a rack shaft.

U.S. Patent Application Publication No. 2014/090921, for example, describes an EPS device provided with a ball screw nut threadably engaged with a rack shaft via balls. A driven pulley is attached to the outer periphery of the ball screw nut so as to be rotatable together. A drive pulley is attached to a rotary shaft of a motor. A rotational force of the motor is transferred to the driven pulley via a belt wound between the driven pulley and the drive pulley. The rotational force of the motor is converted into a force in the axial direction of the rack shaft when the ball screw nut is rotated along with rotation of the driven pulley. In the case where a helical-toothed pulley is used, a force that urges the driven pulley in the axial direction through rotation acts on the driven pulley, and thus movement of the driven pulley in the axial direction of the ball screw nut is suppressed by a retainer (such as a C-shaped retention ring).

While it is true that use of the retainer can suppress movement of the driven pulley in the axial direction, the number of parts of the EPS device is increased by the use of the retainer.

SUMMARY OF THE INVENTION

It is an object of the present invention to provide a steering system with a reduced number of parts.

An aspect of the present invention provides a steering system including: a motor; a steered shaft that is reciprocally movable in an axial direction; a ball screw nut threadably engaged with the steered shaft via a plurality of balls; and a speed reducer that has a driven pulley into which the ball screw nut is inserted so that the driven pulley is fixed to an outer peripheral surface of the ball screw nut, a drive pulley fixed so as to be rotatable together with a rotary shaft of the motor, and a belt wound between the driven pulley and the drive pulley. The outer peripheral surface of the ball screw nut is provided with a groove that extends along a circumferential direction of the ball screw nut, and an inner peripheral surface of the driven pulley is provided with a lug portion to be fitted with the groove.

In this configuration, the lug portion of the driven pulley is engaged with the groove which is provided in the outer peripheral surface of the ball screw nut in the axial direction. Therefore, movement of the driven pulley with respect to the ball screw nut in the axial direction is regulated. It is not necessary to prepare any component other than the driven pulley and the ball screw nut, and thus the number of parts of the steering system can be reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
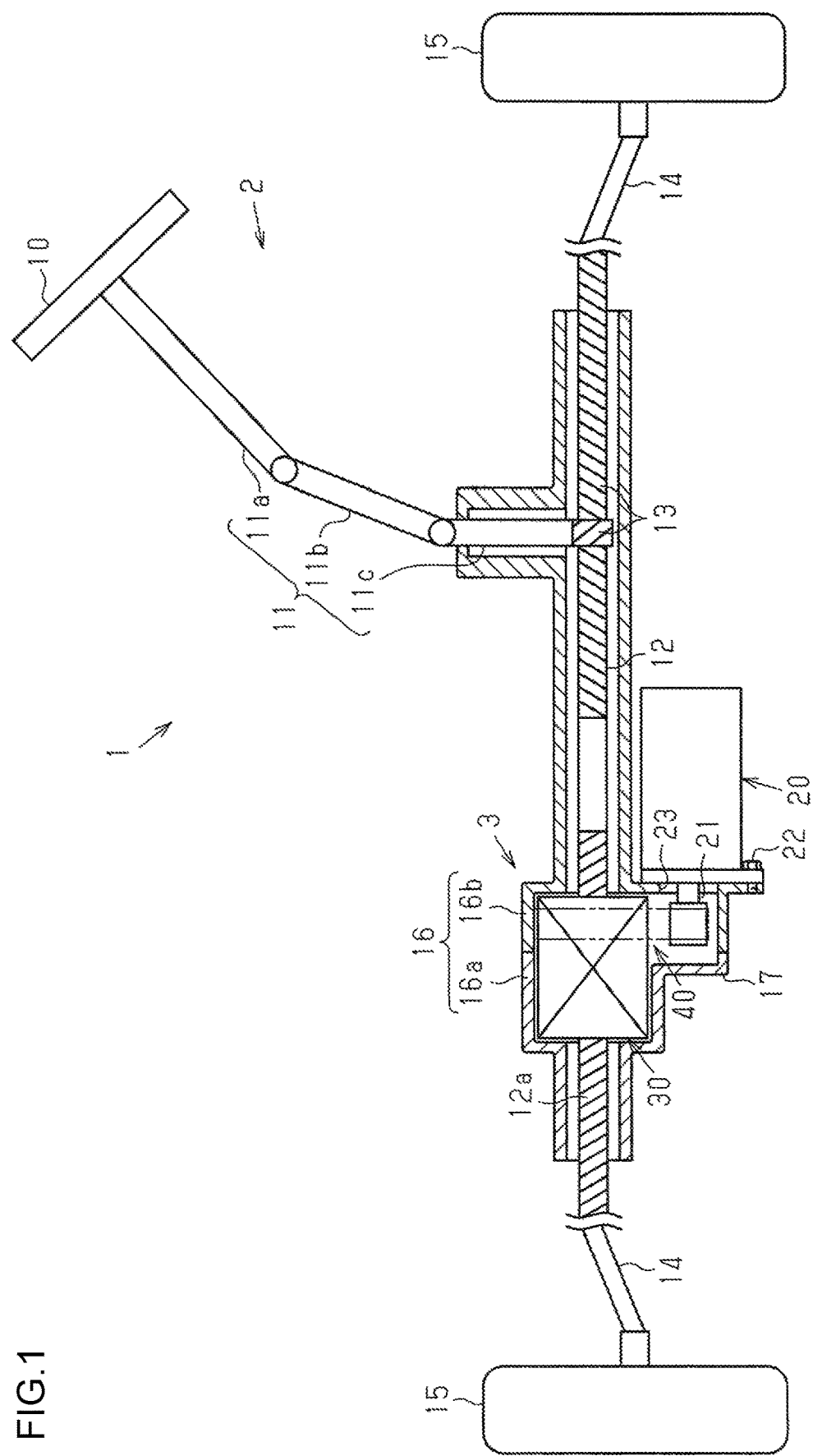
FIG. 1 is a view illustrating a schematic configuration of a steering system according to an embodiment.

An electric power steering (EPS) device according to an embodiment of the present invention will be described below. As illustrated in FIG. 1, the EPS device 1 includes a steering mechanism 2 that steers steered wheels 15 on the basis of an operation of a steering wheel 10 performed by a driver, and an assist mechanism 3 that assists the driver in performing a steering operation.

The steering mechanism 2 includes the steering wheel 10 and a steering shaft 11 that rotates together with the steering wheel 10. The steering shaft 11 has a column shaft 11a coupled to the steering wheel 10, an intermediate shaft 11b coupled to the lower end portion of the column shaft 11a, and a pinion shaft 11c coupled to the lower end portion of the intermediate shaft 11b. The lower end portion of the pinion shaft 11c is coupled to a rack shaft 12 via a rack-and-pinion mechanism 13. Thus, in the steering mechanism 2, rotational motion of the steering shaft 11 is converted into reciprocal linear motion in the axial direction of the rack shaft 12 (right-left direction in FIG. 1) via the rack-and-pinion mechanism 13 which is composed of a pinion provided at the distal end of the pinion shaft 11c and a rack provided on the rack shaft 12. The reciprocal linear motion is transferred to the right and left steered wheels 15 via tie rods 14 coupled to respective ends of the rack shaft 12 to change a steered angle of the steered wheels 15.

The assist mechanism 3 is provided around the rack shaft 12. The assist mechanism 3 is composed of a motor 20 that serves as a generation source of an assist force, a ball screw device 30 integrally attached around the rack shaft 12, and a speed reducer 40 that transfers a rotational force of a rotary shaft 21 of the motor 20 to the ball screw device 30. The assist mechanism 3 converts the rotational force of the rotary shaft 21 of the motor 20 into a force in the axial direction of the rack shaft 12 via the speed reducer 40 and the ball screw device 30 to assist the driver in performing a steering operation.

The ball screw device 30, the speed reducer 40, the pinion shaft 11c, and the rack shaft 12 are covered by a rack housing 16. The rack housing 16 is composed of a first rack housing 16a and a second rack housing 16b separated in the axial direction of the rack shaft 12 around the assist mechanism 3. The first rack housing 16a and the second rack housing 16b are coupled to each other to constitute the rack housing 16. The rack housing 16 has a speed reducer housing 17 provided so as to project in a direction (downward in FIG. 1) that crosses the direction in which the rack shaft 12 extends. A part of the speed reducer 40 is housed inside the speed reducer housing 17. A through hole 23 is provided in a wall surface of the speed reducer housing 17. The rotary shaft 21 of the motor 20 extends into the speed reducer housing 17 through the through hole 23 which is provided in the speed reducer housing 17. The motor 20 is fixed to the speed reducer housing 17 by a bolt 22 such that the rotary shaft 21 extends in parallel with the rack shaft 12.

Figure 2:
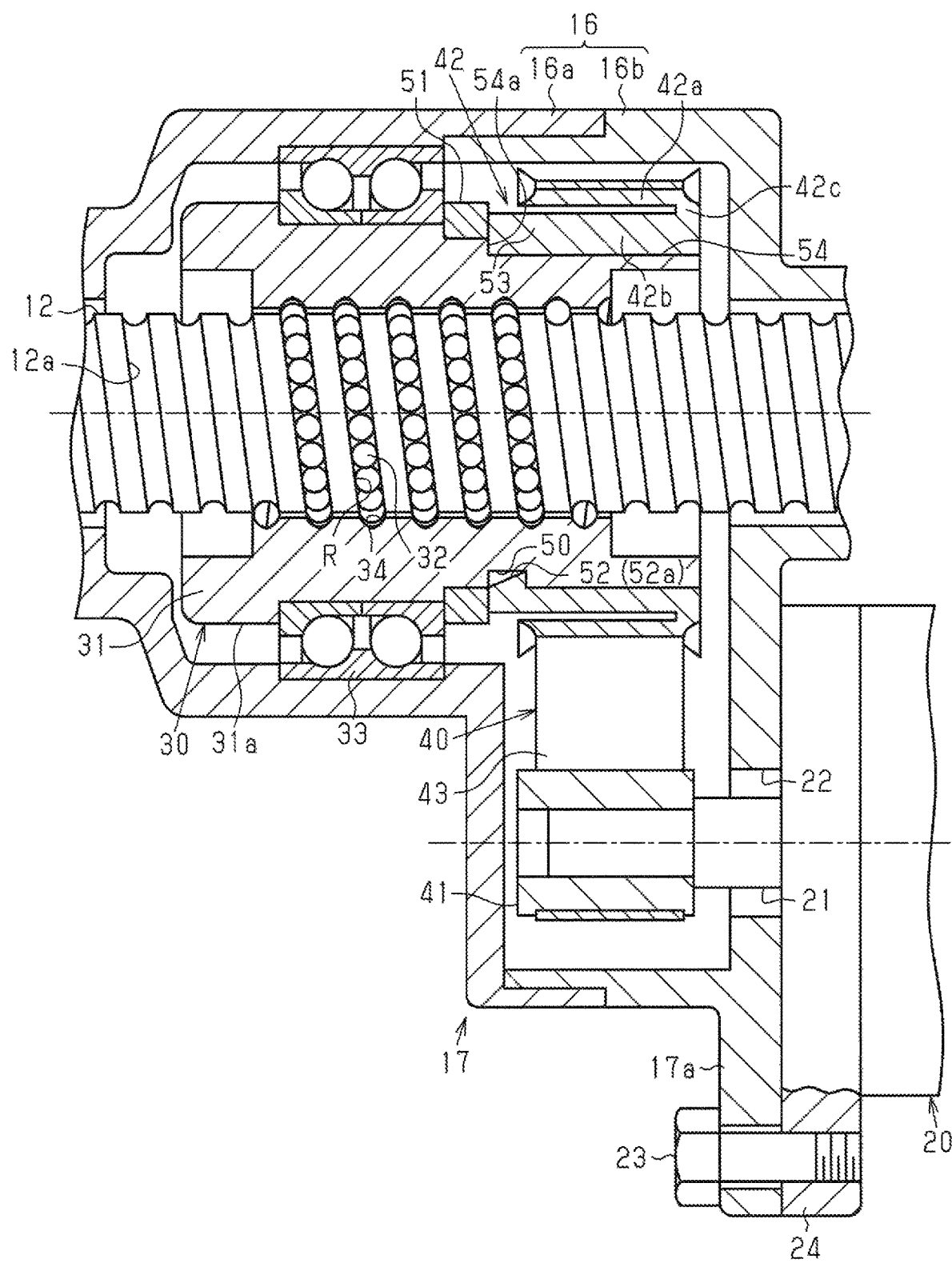
FIG. 2 is a sectional view illustrating a schematic structure of an assist mechanism of the steering system according to the embodiment.

Next, the assist mechanism 3 will be described in detail. As illustrated in FIG. 2, the ball screw device 30 includes a cylindrical ball screw nut 31 threadably engaged with the rack shaft 12 via a plurality of balls 32. The ball screw nut 31 is supported so as to be rotatable with respect to the inner peripheral surface of the rack housing 16 via a cylindrical bearing 33. A spiral screw groove 12a is provided in the outer peripheral surface of the rack shaft 12. A spiral screw groove 34 corresponding to the screw groove 12a of the rack shaft 12 is provided in the inner peripheral surface of the ball screw nut 31. A spiral space surrounded by the screw groove 34 of the ball screw nut 31 and the screw groove 12a of the rack shaft 12 functions as a rolling passage R in which the balls 32 roll. Although not illustrated, the ball screw nut 31 is provided with a circulation passage that opens at two locations of the rolling passage R and that short-circuits the opening portions at the two locations. Thus, the balls 32 can endlessly circulate in the rolling passage R via the circulation passage in the ball screw nut 31. A lubricant such as grease, for example, is applied to the rolling passage R to reduce a frictional resistance caused when the balls 32 roll or the like.

The speed reducer 40 includes a drive pulley 41 integrally attached to the rotary shaft 21 of the motor 20, a driven pulley 42 integrally attached to the outer periphery of the ball screw nut 31, and a belt 43 wound between the drive pulley 41 and the driven pulley 42. The rotary shaft 21 of the motor 20, the drive pulley 41 which is attached to the rotary shaft 21 so as to be rotatable together, and a part of the belt 43 are disposed in the internal space of the speed reducer housing 17. A toothed belt made of rubber and having helical teeth, for example, is adopted as the belt 43. The driven pulley 42 is made of a resin. The ball screw nut 31 is made of metal.

In the thus configured assist mechanism 3, when the rotary shaft 21 of the motor 20 is rotated, the drive pulley 41 is rotated together with the rotary shaft 21. The driven pulley 42 is rotated when rotation of the drive pulley 41 is transferred to the driven pulley 42 via the belt 43. Therefore, the ball screw nut 31 which is integrally attached to the driven pulley 42 is also rotated together. The ball screw nut 31 is rotated relative to the rack shaft 12. Therefore, rotational torque applied to the ball screw nut 31 is converted into a force applied in the axial direction of the rack shaft 12. Therefore, a force that moves the rack shaft 12 with respect to the ball screw nut 31 in the axial direction acts on the rack shaft 12. The force in the axial direction applied to the rack shaft 12 serves as an assist force to assist the driver in performing a steering operation. A portion of the driven pulley 42 on which the belt 43 is wound has helical teeth, and therefore a force that urges the driven pulley 42 in the axial direction along with rotation acts on the driven pulley 42.

A flange portion 31a is provided on the outer peripheral surface at a first end portion (left end in FIG. 2) of the ball screw nut 31 over the entire periphery thereof. An annular groove 50 for retention is provided between the first end portion and a second end portion (right end in FIG. 2) of the ball screw nut 31. An abutment portion 51 is provided between a portion of the ball screw nut 31 in which the groove 50 is provided and the first end portion of the ball screw nut 31. The abutment portion 51 positions the driven pulley 42 in the axial direction when the driven pulley 42 is assembled to the ball screw nut 31. The abutment portion 51 is provided orthogonally to the axial direction of the ball screw nut 31.

As illustrated in FIG. 2, the driven pulley 42 has a cylindrical radially outer portion 42a around which the belt 43 is wound, a radially inner portion 42b attached so as to be rotatable together with the ball screw nut 31, and a connection portion 42c that connects the radially outer portion 42a and the radially inner portion 42b to each other in the radial direction at their second end portions (right ends in FIG. 2).

Figure 3:
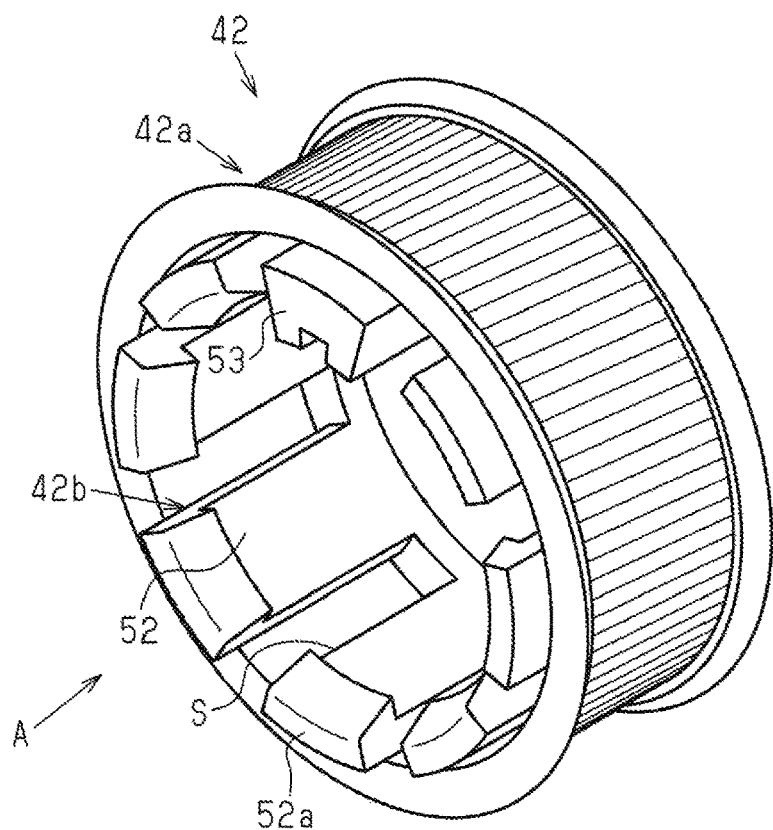
FIG. 3 is a perspective view illustrating a schematic structure of a driven pulley of the steering system according to the embodiment.

As illustrated in FIG. 3, the radially inner portion 42b is provided with a plurality of (eight) slits S (clearances) at equal intervals in the circumferential direction. The slits S extend in the axial direction of the driven pulley 42. Seven retention portions 52 and one key portion 53 are provided at portions of the radially inner portion 42b between the slits S. The retention portions 52 and the key portion 53 also extend in the axial direction of the driven pulley 42. Lug portions 52a are provided at the distal ends (end portions opposite to the connection portion 42c) of the retention portions 52. The outer peripheral surface of the ball screw nut 31 is provided with a key groove 54 that extends in the axial direction of the ball screw nut 31 over a certain range from the second end portion of the ball screw nut 31. The key groove 54 is preferably provided so as to be deeper than the groove 50. Correspondingly, the key portion 53 preferably projects in the radial direction more than the lug portions 52a.

With the driven pulley 42 attached to the outer peripheral surface of the ball screw nut 31, the lug portions 52a of the retention portions 52 are fitted with the groove 50 of the ball screw nut 31. In addition, the key portion 53 is engaged with the key groove 54. With the driven pulley 42 attached to the outer peripheral surface of the ball screw nut 31, in addition, the distal end (an end portion opposite to the connection portion 42c) of the key portion 53 abuts against an abutment portion 54a. The abutment portion 54a is provided orthogonally to the axial direction of the ball screw nut 31.

When attaching the driven pulley 42 to the outer peripheral surface of the ball screw nut 31, the ball screw nut 31 is relatively inserted into the radially inner portion 42b to elastically deform the retention portions 52, and the driven pulley 42 is pressed from the second end portion of the ball screw nut 31 toward the first end portion with the lug portions 52a at the distal ends of the retention portions 52 pushed radially outward. When the lug portions 52a are moved to a position corresponding to the groove 50, the retention portions 52 are elastically returned to the original position in the radial direction. Consequently, the lug portions 52a are fitted with the groove 50. With the lug portions 52a engaged with the inner wall surface of the groove 50 in the axial direction, movement of the driven pulley 42 with respect to the ball screw nut 31 in the axial direction is suppressed.

Figure 4:
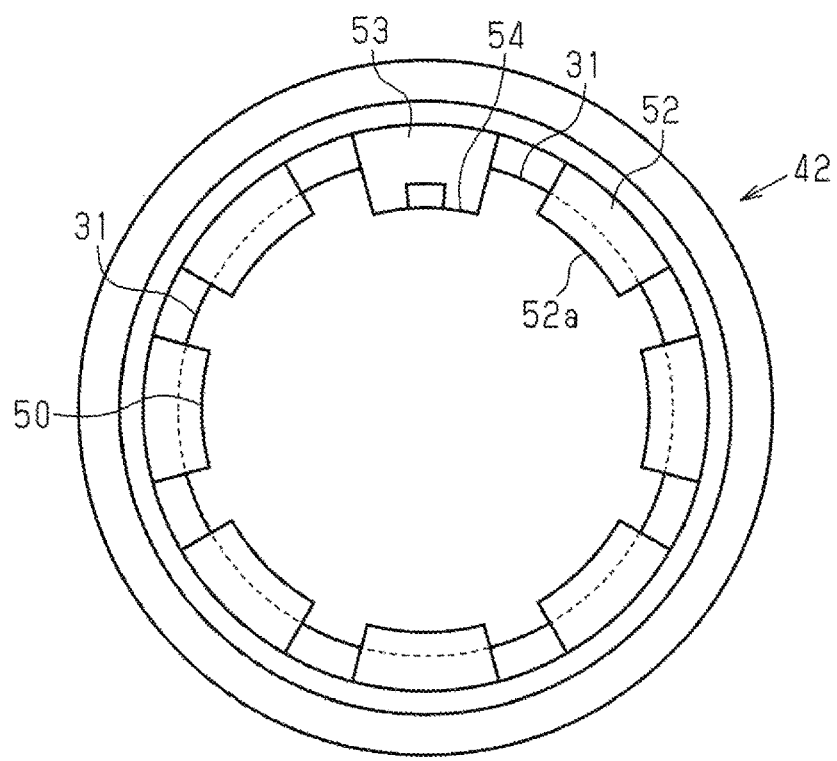
FIG. 4 illustrates a schematic structure of the driven pulley as seen from the A direction of FIG. 3.

When the driven pulley 42 is attached to the outer peripheral surface of the ball screw nut 31, the key portion 53 is fitted with the key groove 54 to be guided. As schematically illustrated in FIG. 4, the rotational force of the driven pulley 42 is transferred to the ball screw nut 31 with the key portion 53 engaged with the key groove 54 of the ball screw nut 31 in the circumferential direction. Therefore, the ball screw nut 31 is rotated together with the driven pulley 42.

Figure 5:
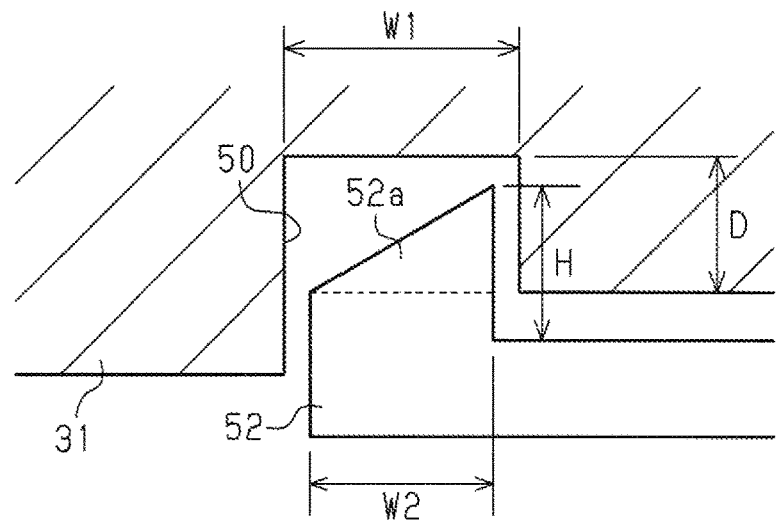
FIG. 5 is a schematic view illustrating a schematic structure of a retention portion of the driven pulley of the steering system according to the embodiment.

Next, the groove 50 and the lug portions 52a of the retention portions 52 will be described in detail. As illustrated in FIG. 5, a depth D and a width W1 (axial length) of the groove 50 and a height H and a width W2 of the lug portions 52a are determined in consideration of the difference between the coefficient of thermal expansion of the ball screw nut 31 and the coefficient of thermal expansion of the driven pulley 42 and the shearing stress of the lug portions 52a. For example, the height H and the width W2 of the lug portions 52a are increased along with a temperature rise, and therefore the lug portions 52a are expanded outward in the circumferential direction. The widths W1 and W2 are set such that the width W2 of the lug portions 52a does not exceed the width W1 of the groove 50 at the upper limit of the use temperature range, and such that the width W2 is not excessively smaller than the width W1 at normal or low temperatures. By way of example, a clearance is provided between the groove 50 and the lug portions 52a at normal temperature (at low temperature). At high temperature, the lug portions 52a are thermally expanded more than the groove 50, which leaves substantially no clearance between the groove 50 and the lug portions 52a.

Here, by way of example, the width W1 of the groove 50 can be represented by the following formula (1) using the width W2 of the lug portions 52a, a coefficient of linear expansion $\alpha 1$ of the ball screw nut 31, a coefficient of linear expansion $\alpha 2$ of the driven pulley 42, a temperature variation amount T from normal temperature, and a clearance CL between the groove 50 and the lug portions 52a in the axial direction:

$$(W1+\alpha 1 \cdot W1 \cdot T)=(W2+\alpha 2 \cdot W2 \cdot T)+CL \quad (1)$$

In order to improve assemblability, in addition, a tapered surface is preferably provided on the inner peripheral side of the distal ends of the lug portions 52a. The depth D of the groove 50 and the height H of the lug portions 52a are set such that the lug portions 52a are not shear-fractured by a shearing stress in correspondence with the tapered surface of the lug portions 52a.

Figure 6:
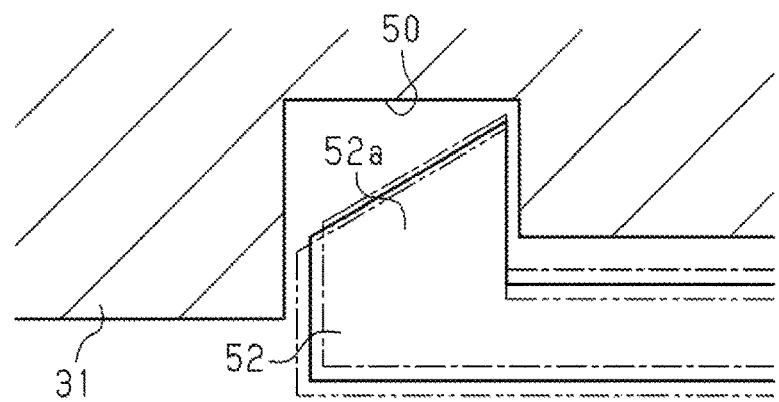
FIG. 6 illustrates a fitted state at the time when the retention portion of the driven pulley is subjected to temperature variations.

FIG. 6 illustrates the relationship between the groove 50 and the lug portion 52a at the time when the temperature is varied. Here, in order to simplify description, thermal expansion of the ball screw nut 31 is not taken into consideration, and only thermal expansion of the lug portions 52a of the driven pulley 42 which is a resin member is taken into consideration. The continuous line indicates the lug portion 52a at normal temperature, the long dashed short dashed line indicates the lug portion 52a at low temperature, and the long dashed double-short dashed line indicates the lug portion 52a at high temperature. As the temperature rises, the depth of fitting of the lug portion 52a with the groove 50 becomes smaller. As the temperature lowers, in contrast, the depth of fitting of the lug portion 52a with the groove 50 becomes larger. As the depth of fitting of the lug portion 52a with the groove 50 becomes smaller, the effective area for receiving a shearing stress that acts on the lug portion 52a when the driven pulley 42 is moved in the axial direction with respect to the ball screw nut 31 becomes smaller. Therefore, the lug portion 52a is shear-fractured more easily along with a temperature rise.

Therefore, it is necessary to set the height H of the lug portion 52a so as not to be excessively high with respect to the depth D of the groove 50 such that the lug portion 52a is not shear-fractured even in the case where the lug portion 52a is thermally expanded or even when the driven pulley 42 is urged to be moved in the axial direction with respect to the ball screw nut 31.

The function and the effect of the embodiment will be described.

(1) With the lug portions 52a of the retention portions 52 which are provided on the driven pulley 42 fitted with the groove 50 which is provided in the ball screw nut 31, movement of the driven pulley 42 in the axial direction with respect to the ball screw nut 31 is regulated. Therefore, it is not necessary to use any other component (e.g. a retention ring) in order to fix the driven pulley 42 and the ball screw nut 31 to each other in the axial direction. Therefore, the number of parts of the EPS device 1 (assist mechanism 3) can be further reduced. Since the number of parts of the EPS device 1 is reduced, in addition, the cost and the number of man-hours required to manufacture the EPS device 1 can also be reduced.

(2) With the key portion 53 which is provided on the driven pulley 42 engaged with the key groove 54 which is provided in the ball screw nut 31, a rotational force is transferred between the driven pulley 42 and the ball screw nut 31. Therefore, it is not necessary to provide another component for regulating relative rotation between the driven pulley 42 and the ball screw nut 31, and thus the number of parts can be further reduced.

(3) The driven pulley 42 can be assembled to the ball screw nut 31 just by pressing the driven pulley 42 toward the ball screw nut 31 along the axial direction. The lug portions 52a are fitted with the groove 50 with the retention portions 52, which have been pushed radially outward, elastically returned. Therefore, the driven pulley 42 can be easily fixed to the ball screw nut 31.

In the present embodiment, in particular, a driven pulley of a double structure with the radially outer portion 42a and the radially inner portion 42b is adopted. Thus, the radially inner portion 42b can be made more elastically deformable than the radially outer portion 42a. For example, the radially inner portion 42b is provided with the slits S, which makes the radially inner portion 42b easily deformable. The wall thickness of the driven pulley 42 can be reduced uniformly, which can suppress formation of sink marks during molding.

(4) The dimensions of the lug portions 52a and the groove 50 are set in consideration of thermal expansion and a shearing stress. Therefore, the lug portions 52a can be prevented from slipping out of the groove 50 because of thermal expansion even in the case where the temperature rises, and a sufficient shearing area of the lug portions 52a can be secured.

(5) In the case where the driven pulley 42 which is made of a resin is adopted, the driven pulley 42 can be provided by injection molding or the like. Therefore, the number of machining man-hours or the number of parts, in particular, is not increased to provide the lug portions 52*a* of the retention portions 52 and the key portion 53.

The present embodiment may be modified as follows. The following other embodiments may be combined with each other as long as the embodiments do not technically contradict with each other. In the present embodiment, an end surface of the groove 50 in the axial direction is provided in parallel with a direction that is orthogonal to the axial direction. However, such an end surface may be tilted.

Figure 7:
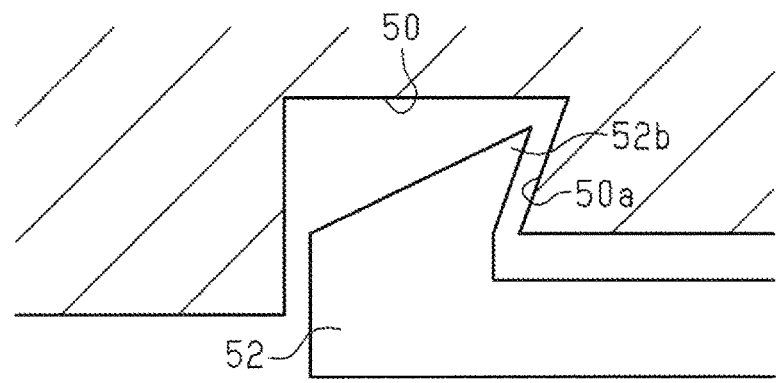
FIG. 7 is a schematic view illustrating a schematic structure of a retention portion of a driven pulley of a steering system according to another embodiment.

For example, as illustrated in FIG. 7, one end surface 50*a* of the groove 50 in the axial direction may be provided as tilted with respect to a direction (up-down direction in FIG. 7) that is orthogonal to the axial direction. In this case, a lug portion 52*b* is preferably also tilted like an arrow head in correspondence with the one end surface 50*a* of the groove 50. With this configuration, the lug portion 52*b* can be further prevented from slipping out of the groove 50 after the lug portion 52*b* is fitted with the groove 50.

In the present embodiment, the annular groove 50 is provided in the outer peripheral surface of the ball screw nut 31. However, the present invention is not limited thereto. For example, the outer peripheral surface of the ball screw nut 31 may be provided with a groove that partially extends along such a peripheral surface.

In the present embodiment, the driven pulley 42 has the radially outer portion 42*a*, the radially inner portion 42*b*, and the connection portion 42*c*. However, the present invention is not limited thereto. For example, the driven pulley 42 may have a single cylindrical structure in which the radially outer portion 42*a* and the radially inner portion 42*b* are connected to each other over the entire region in the axial direction.

Figure 8:
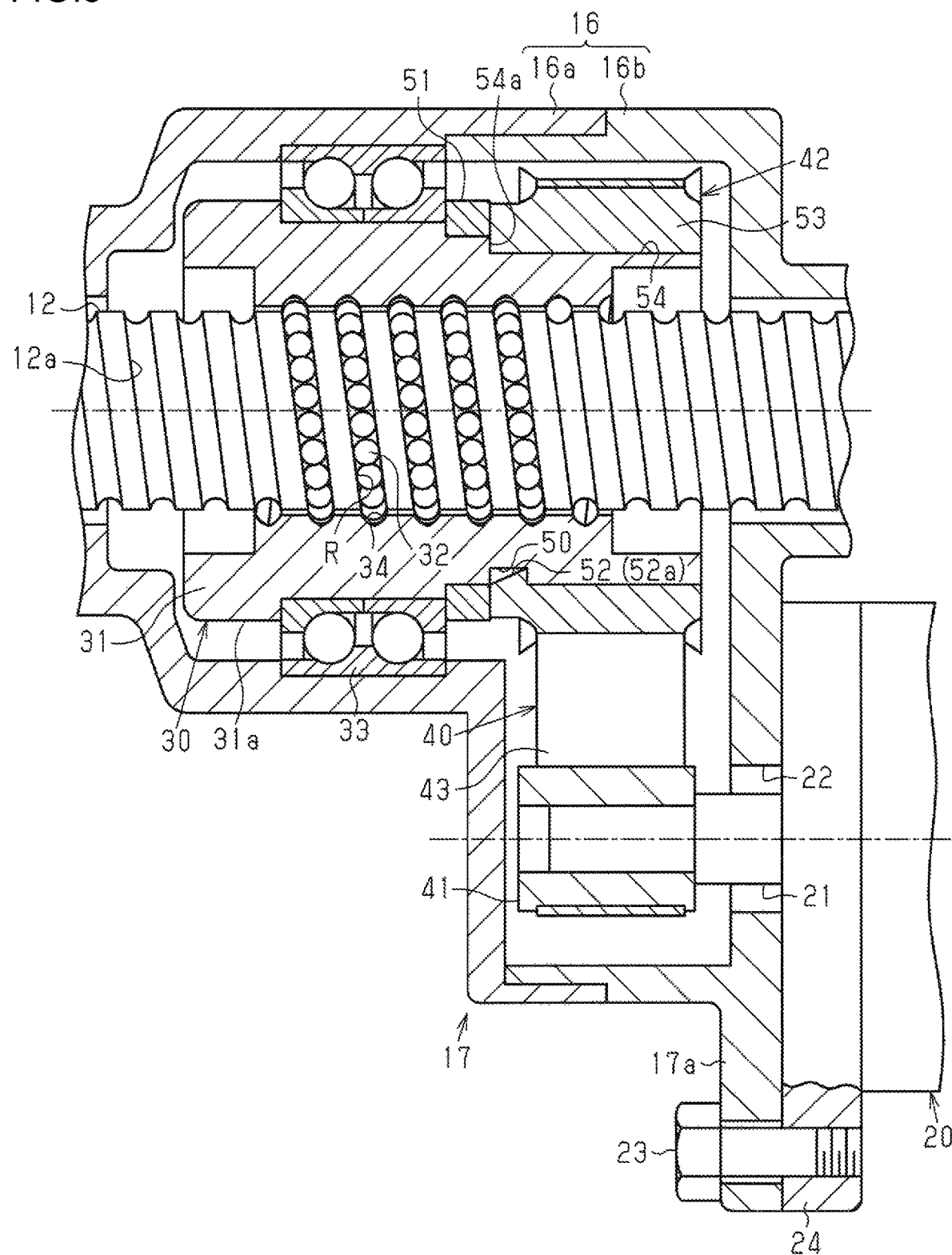
FIG. 8 is a sectional view illustrating a schematic structure of an assist mechanism of a steering system according to another embodiment.

For example, as illustrated in FIG. 8, the driven pulley 42 and the ball screw nut 31 are fixed so as to be rotatable together, with the lug portions 52*a* and the key portion 53 which are provided on the inner peripheral surface of the driven pulley 42 fitted with the groove 50 and the key groove 54 which are provided in the outer peripheral surface of the ball screw nut 31. In this case, the lug portions 52*a* are shaped so as to be adjacent to a side surface of the body of the thick-walled driven pulley 42, and therefore it is difficult to elastically deform the lug portions 52*a*. However, it is possible to attach the lug portions 52*a* to the groove 50 by making the height H of the lug portions 52*a* small.

In the present embodiment, the abutment portion 51 is provided on the outer peripheral surface of the ball screw nut 31. However, the abutment portion 51 may not be provided. In this case, the driven pulley 42 may abut against an inner ring of the bearing 33 in the axial direction, for example. Alternatively, the distal end of the key portion 53 of the driven pulley 42 may abut against an end portion of the key groove 54 on the deeper side. In the present embodiment, the distal end of the key portion 53 abuts against the abutment portion 51. However, the distal ends of the retention portions 52, in place of the distal end of the key portion 53, may abut against the abutment portion 51.

Figure 9:
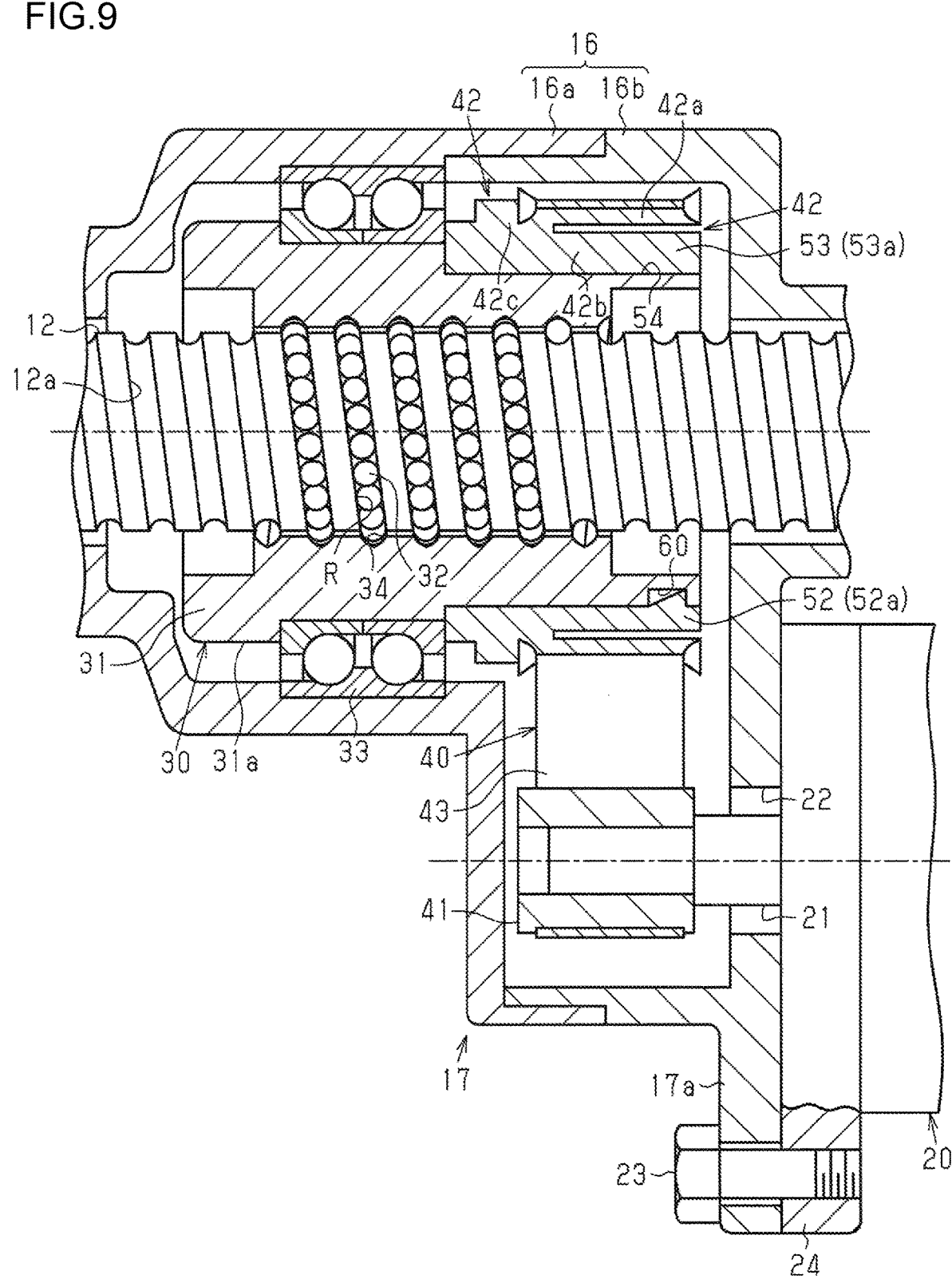
FIG. 9 is a sectional view illustrating a schematic structure of an assist mechanism of a steering system according to another embodiment.
Figure 10:
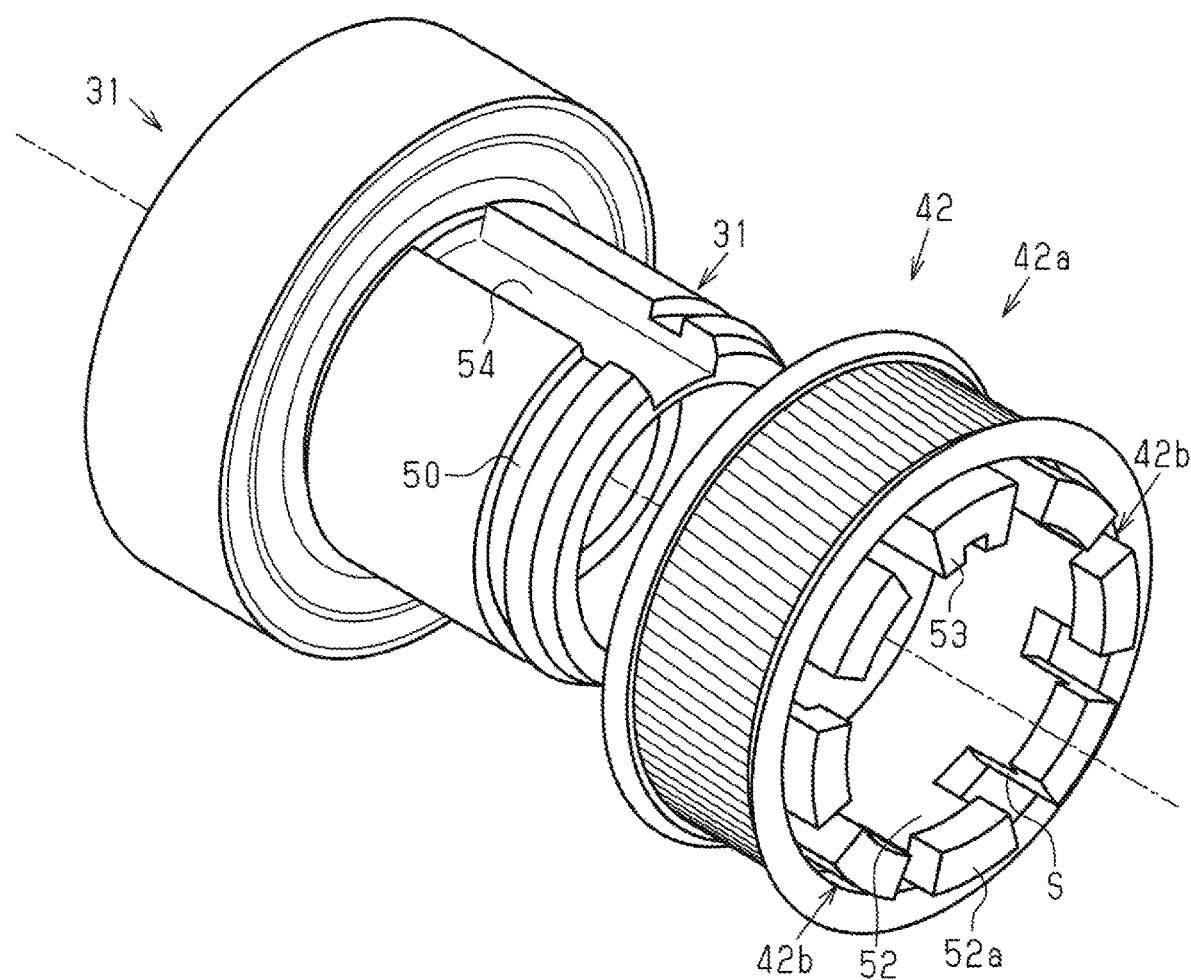
FIG. 10 is a perspective view illustrating a state of a driven pulley and a ball screw nut immediately before assembly in the steering system according to another embodiment.

In the present embodiment, the annular groove 50 for retention is provided between the first end portion and the second end portion of the ball screw nut 31 and on the side of the first end portion. However, the present invention is not limited thereto. For example, as illustrated in FIGS. 9 and 10, an annular groove 60 may be provided at the second end portion (right end in FIG. 9) of the ball screw nut 31. A connection portion 42*c* that connects the radially outer portion 42*a* and the radially inner portion 42*b* to each other in the radial direction is provided on the side of the first end. The radially outer portion 42*a* and the radially inner portion 42*b* of the driven pulley 42 extend from the connection portion 42*c* toward the second end portion in the axial direction of the driven pulley 42. In addition, retention portions are provided at an end portion of the driven pulley 42 opposite to the bearing 33 when the driven pulley 42 is assembled to the ball screw nut 31. In this case, the lug portions 52*a* are fitted with the groove 60 at the same time as the driven pulley 42 is completely fitted with the ball screw nut 31.

In the present embodiment, the lug portion 52*a* is provided with a tapered surface in order to improve assemblability. However, the present invention is not limited thereto. For example, as illustrated in FIG. 10, a tapered surface may be provided at the outer periphery of an end portion of the ball screw nut 31. In this case, the lug portions 52*a* are not provided with a tapered surface so that the lug portions 52*a* have a rectangular sectional shape along the axis of the driven pulley 42.

In the present embodiment, the connection portion 42*c* connects the radially outer portion 42*a* and the radially inner portion 42*b* to each other in the radial direction at the second end portion. However, the connection portion 42*c* may connect the radially outer portion 42*a* and the radially inner portion 42*b* to each other in the radial direction at the first end portion (see FIG. 9).

The slits S may be provided only in a certain range from the distal ends of the retention portions 52 and the key portion 53 toward the connection portion 42*c* (see FIG. 10). In the present embodiment, eight slits S are provided in the radially inner portion 42*b* of the driven pulley 42 at equal intervals in the circumferential direction. However, any number of slits S may be provided, or no slits S may be provided. The number of slits S can be changed freely in accordance with the ease of elastic deformation required for the radially inner portion 42*b*. It is only necessary that one or more retention portions 52 should be provided in the circumferential direction. Two or more key portions 53 may be provided in the circumferential direction, or no key portions 53 may be provided.

In the present embodiment, the ball screw nut 31 is provided with the key groove 54, and the driven pulley 42 is provided with the key portion 53. However, a different rotation locking structure may be provided instead. If only torque in such a range that rotation of the driven pulley 42 relative to the ball screw nut 31 is not caused is applied to the driven pulley 42, a fastening structure that press-fits the inner peripheral surface of the driven pulley 42 with the outer peripheral surface of the ball screw nut 31 may be provided.

In the present embodiment, the abutment portion 51 is provided with a surface that is orthogonal to the axial direction of the ball screw nut 31. However, the present invention is not limited thereto. For example, the abutment portion 51 may include an oblique surface, and such a surface may be provided so as to abut against the driven pulley 42. The abutment portion 54*a* may also be provided obliquely with respect to the axial direction of the ball screw nut 31.

In the present embodiment, the present invention is embodied as the EPS device 1 which applies an assist force to the rack shaft 12 using the motor 20 which has the rotary shaft 21 which is disposed in parallel with the rack shaft 12. However, the present invention is not limited thereto. That is, the present invention may be embodied as a steering system that includes the ball screw device 30 and the speed reducer 40. In addition, the present invention is applied to a steering system that assists linear motion of the rack shaft 12, which occurs in conjunction with a steering operation, utilizing the rotational force of the motor 20. However, the present invention may be applied to a steer-by-wire (SBW) steering system that includes no mechanical coupling between the steering wheel 10 and the rack shaft 12. In the case where the present invention is embodied as an SBW steering system, the present invention may be embodied not only as a front-wheel steering system but also as a rear-wheel steering system or a four-wheel steering (4WS) system.

What is claimed is:

1. A steering system comprising:
    a motor;
    a steered shaft that is reciprocally movable in an axial direction;
    a ball screw nut threadably engaged with the steered shaft via a plurality of balls; and
    a speed reducer that has a driven pulley into which the ball screw nut is inserted so that the driven pulley is fixed to an outer peripheral surface of the ball screw nut, a drive pulley fixed so as to be rotatable together with a rotary shaft of the motor, and a belt wound between the driven pulley and the drive pulley, wherein
    the outer peripheral surface of the ball screw nut is provided with a groove that extends along a circumferential direction of the ball screw nut, and an inner peripheral surface of the driven pulley is provided with a lug portion to be fitted with the groove.

2. The steering system according to claim 1, wherein the driven pulley has a cylindrical radially outer portion around which the belt is wound, a radially inner portion disposed inside the radially outer portion and attached so as to be rotatable together with the ball screw nut, and a connection portion that connects the radially outer portion and the radially inner portion to each other in a radial direction.

3. The steering system according to claim 2, wherein:
    the radially inner portion is provided with slits provided at equal intervals in the circumferential direction to extend in the axial direction; and
    the lug portion is provided at portions of the radially inner portion between the slits and on an inner peripheral surface of distal end portions of the radially inner portion that are opposite to the connection portion.

4. The steering system according to claim 1, further comprising:
    a rack housing that houses the ball screw nut and the speed reducer; and
    a bearing that supports the ball screw nut so as to be rotatable with respect to an inner peripheral surface of the rack housing, wherein
    the groove is provided at an end portion of a portion of the ball screw nut to which the driven pulley is fixed, the end portion being closer to a portion of the ball screw nut to which the bearing is fixed.

5. The steering system according to claim 1, further comprising:
    a rack housing that houses the ball screw nut and the speed reducer; and
    a bearing that supports the ball screw nut so as to be rotatable with respect to an inner peripheral surface of the rack housing, wherein
    the groove is provided at an end portion of a portion of the ball screw nut to which the driven pulley is fixed, the end portion being opposite to a portion of the ball screw nut to which the bearing is fixed.

6. The steering system according to claim 1, wherein:
    the outer peripheral surface of the ball screw nut is provided with a key groove that extends in the axial direction; and
    the inner peripheral surface of the driven pulley is provided with a key portion that extends in the axial direction to be fitted with the key groove.

7. The steering system according to claim 1, wherein:
    the outer peripheral surface of the ball screw nut is provided with an abutment portion that is located adjacent to the groove in the axial direction and that has a surface that is orthogonal to or oblique with respect to the axial direction of the ball screw nut; and
    an end portion of the driven pulley in the axial direction abuts against the abutment portion.

8. The steering system according to claim 1, wherein:
    the belt has helical teeth; and
    the driven pulley has helical teeth corresponding to the helical teeth of the belt.

* * * * *